United States Patent
Chen et al.

(10) Patent No.: US 11,663,460 B2
(45) Date of Patent: May 30, 2023

(54) DATA EXCHANGE METHOD, DATA EXCHANGE DEVICE AND COMPUTING DEVICE

(71) Applicant: THE FOURTH PARADIGM (BEIJING) TECH CO LTD, Beijing (CN)

(72) Inventors: Yuqiang Chen, Beijing (CN); Wenyuan Dai, Beijing (CN)

(73) Assignee: THE FOURTH PARADIGM (BEIJING) TECH CO LTD, Beijing (CN)

(*) Notice: Subject to any disclaimer, the term of this patent is extended or adjusted under 35 U.S.C. 154(b) by 1289 days.

(21) Appl. No.: 15/998,973

(22) PCT Filed: Feb. 16, 2017

(86) PCT No.: PCT/CN2017/073740
§ 371 (c)(1),
(2) Date: Aug. 17, 2018

(87) PCT Pub. No.: WO2017/140248
PCT Pub. Date: Aug. 24, 2017

(65) Prior Publication Data
US 2019/0258927 A1  Aug. 22, 2019

(30) Foreign Application Priority Data
Feb. 17, 2016  (CN) .......................... 201610088146.5

(51) Int. Cl.
*G06N 3/08* (2006.01)
*G06N 20/10* (2019.01)
(Continued)

(52) U.S. Cl.
CPC ............... *G06N 3/08* (2013.01); *G06F 17/16* (2013.01); *G06N 3/04* (2013.01); *G06N 20/10* (2019.01); *G06N 5/003* (2013.01)

(58) Field of Classification Search
CPC .............. G06N 3/02; G06N 3/04; G06N 3/08; G06N 3/088; G06N 20/00; G06N 20/10; G06N 20/20; G06N 5/003; G06F 17/16
See application file for complete search history.

(56) References Cited

U.S. PATENT DOCUMENTS

| 2006/0242261 | A1 | 10/2006 | Piot et al. |
| 2010/0223336 | A1 | 9/2010 | Fu et al. |
| 2011/0082824 | A1 | 4/2011 | David et al. |
| 2015/0220833 | A1* | 8/2015 | Le .......................... G06F 16/583 706/16 |

(Continued)

FOREIGN PATENT DOCUMENTS

| CN | 101213569 A | 7/2008 |
| CN | 101604319 A | 12/2009 |

(Continued)

OTHER PUBLICATIONS

Sabine McConnell et al. "Building Predictors from Vertically Distributed Data" 2004, School of Computing, Queen's University, Kingston, Canada.

*Primary Examiner* — Shane D Woolwine
(74) *Attorney, Agent, or Firm* — Bridgeway IP Law Group, PLLC; Sang Ho Lee; Hyun Woo Shin (57) ABSTRACT

A data exchange method, a data exchange device, and a computing device for data exchange between a provider and a recipient for machine learning, the method including: (a) receiving a machine learning model from the provider (S1100); (b) respectively transforming output data samples into corresponding output eigenvectors by utilizing the machine learning model from the provider (S1200); (c) after (Continued)

transformation, combining the output eigenvectors with corresponding identifiers to form exchange samples (S1300). According to the data exchange method, original data is transformed into vector information which cannot be restored but can be applied to machine learning, for use in exchange, so as to, on one hand, enable efficient use of data for machine learning and, on the other hand, prevent unauthorized use, sale or disclosure of the original data.

19 Claims, 6 Drawing Sheets

(51) Int. Cl.
*G06F 17/16* (2006.01)
*G06N 3/04* (2006.01)
*G06N 5/00* (2006.01)

(56) References Cited

U.S. PATENT DOCUMENTS

| | | | |
|---|---|---|---|
| 2016/0048766 A1* | 2/2016 | McMahon | G06Q 40/08 706/12 |
| 2017/0185894 A1* | 6/2017 | Volkovs | G06N 3/08 |
| 2017/0371932 A1* | 12/2017 | Chamarajnagar | G06F 7/20 |

FOREIGN PATENT DOCUMENTS

| | | |
|---|---|---|
| CN | 101819570 A | 9/2010 |
| CN | 102385705 A | 3/2012 |
| CN | 105046560 A | 11/2015 |
| CN | 105260794 A | 1/2016 |
| CN | 105260835 A | 1/2016 |
| CN | 105760932 A | 7/2016 |

* cited by examiner

DATA EXCHANGE METHOD, DATA EXCHANGE DEVICE AND COMPUTING DEVICE

TECHNICAL FIELD

The present invention generally relates to a data exchange technology and more particularly, to a data exchange method, a data exchange device, and a computing device for data exchange between a provider and an acquirer with respect to a machine learning task.

DESCRIPTION OF RELATED ART

With the development of technologies such as big data, cloud computing and artificial intelligence, etc., machine learning is widely used to mine, from the massive data, useful information hidden therein.

In order to use the machine learning, it is often required to learn a model represented as a function with its parameters from a given set of training data, and the model can be used for new data when the new data arrives. In order to better learn or use the model, it is often also required that data from outside is involved in the learning (for example, training) or application of the model, and these data may be purchased from the outside, or obtained otherwise from the outside.

For example, when a bank hopes to predict a fraud risk of a user applying for a credit card through a data mining technology, various information filled in by a large number of users in the past when applying for a credit card and corresponding true credit records thereof may be used as historical data to train a prediction model for the fraud risk through a machine learning algorithm. In this way, when a new user applies for a credit card, the fraud risk of the new user applying for the credit card may be predicted by using the prediction model based on various information filled in by the new user.

However, in some cases, various information filled in by the user is not enough to characterize the user's profile accurately. Accordingly, it may not be possible to accurately determine whether the user has a fraud motive only based on user data owned by the bank. For this purpose, the bank needs to combine various external data for the training of the model. As an example, the external data may include: mobile Internet behavior data (including a mobile phone number, contact data, a mobile phone model, a manufacturer, hardware information, a frequently used APP, a social media content, etc.), mobile apparatus communication data (including the mobile phone number, the contact data, and a call history), mobile operator data (including the mobile phone number, a web surfing behavior, and an APP usage behavior).

It should be noted that: when the above-mentioned data is exchanged in plaintext (or encryption), it is easy to leak the user's private information or other information that is not suitable for disclosure, and the data exchanged in plaintext is very easy to be reused or resold without authorization, thus it is difficult to technically guarantee the legal use of the data. For example, when a data provider provides the bank with the above-mentioned external data to be used, the data provider will worry that the user's privacy is unwarrantedly leaked or the data may be reused or resold without authorization.

SUMMARY

According to an aspect of an exemplary embodiment of the present invention, a method for data exchange between a provider and an acquirer with respect to machine learning is provided, the method includes: (a) obtaining a provider machine learning model; (b) transforming output data samples to be provided to the acquirer among data samples of the provider into corresponding output feature vectors respectively, using the provider machine learning model; and (c) combining the transformed output feature vectors with corresponding identifiers into exchange samples, wherein the exchange samples are able to be applied to the machine learning by the acquirer.

According to another aspect of an exemplary embodiment of the present invention, a data exchange device for data exchange between a provider and an acquirer with respect to machine learning is provided, the data exchange device includes: a provider machine learning model obtaining unit configured to obtain a provider machine learning model; an output feature vector transformation unit configured to transform output data samples to be provided to the acquirer among data samples of the provider into corresponding output feature vectors respectively, using the provider machine learning model; and an exchange sample generation unit configured to combine the transformed output feature vectors with corresponding identifiers into exchange samples, wherein the exchange samples are able to be applied to the machine learning by the acquirer.

According to another aspect of an exemplary embodiment of the present invention, a computing device for data exchange between a provider and an acquirer with respect to machine learning is provided, the computing device includes a storage component having a set of computer executable instructions stored therein, and a processor, wherein, when the set of the computer executable instructions is executed by the processor, following steps are performed: a provider machine learning model obtaining step, for obtaining a provider machine learning model; an output feature vector transformation step, for transforming output data samples to be provided to the acquirer among data samples of the provider into corresponding output feature vectors respectively, using the provider machine learning model; and an exchange sample generation step, for combining the transformed output feature vectors with corresponding identifiers into exchange samples, wherein the exchange samples are able to be applied to the machine learning by the acquirer.

The data exchange method, the data exchange device, and the computing device according to embodiments of the present invention transform the data to be exchanged into the output feature vector that is not recoverable but has meaning for the machine learning, using a machine learning algorithm, and the output feature vector may be a selection, conversion, and/or combination, etc. of features of original data under the machine learning algorithm, thus can be applied to the machine learning and the like by the data acquirer.

BRIEF DESCRIPTION OF THE DRAWINGS

These and/or other aspects and advantages of the present invention will become more apparent and easier to be understood from the following detailed description of embodiments of the present invention, taken in conjunction with accompanying drawings, in which.

DETAILED DESCRIPTION OF EXEMPLARY EMBODIMENTS

In order to make those skilled in the art better understand the present invention, the present invention is further described in detail below in conjunction with the accompanying drawings and specific embodiments.

Figure 1:
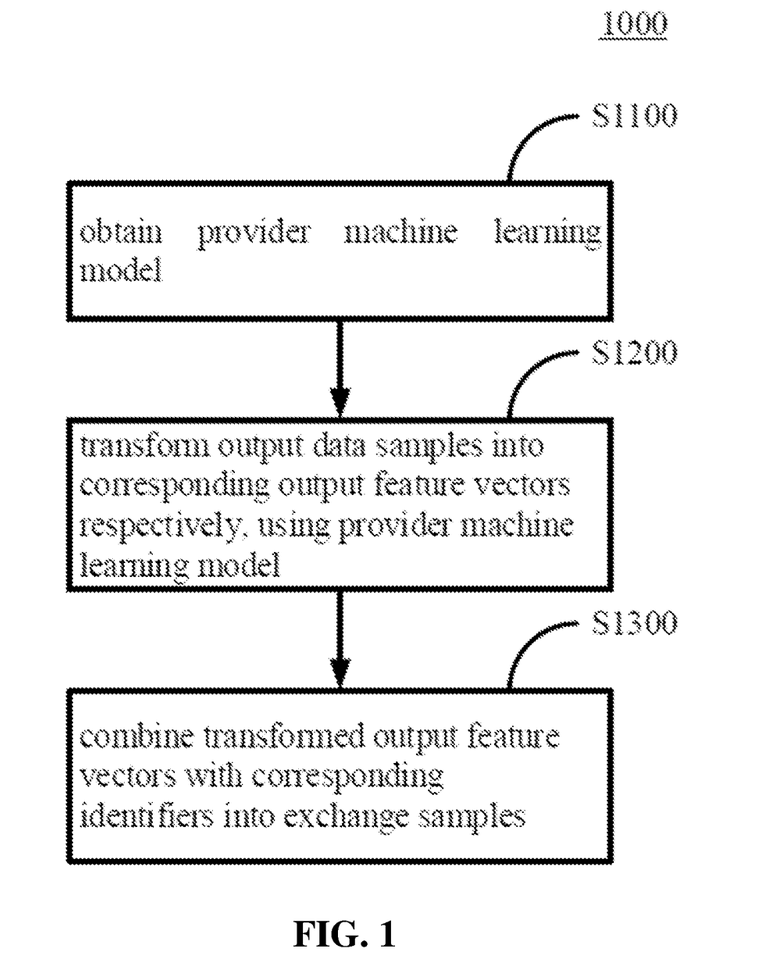
FIG. 1 illustrates a general flow chart of a data exchange method 1000 according to an embodiment of the present invention.

FIG. 1 illustrates a general flow chart of a data exchange method 1000 according to an embodiment of the present invention.

In the method illustrated in FIG. 1, "exchange" refers to a sharing behavior performed for using data, which includes, but is not limited to, a process of sending data from a provider to an acquirer. Here, the provider refers to the provider of the data to be exchanged, and may be the direct or indirect source of the data to be exchanged; the acquirer refers to a party that desires to acquire the data to be exchanged, and may be a direct user who directly uses the data to be exchanged or an indirect user who uses the data to be exchanged via other parties. It should be noted that a reverse exchange, in which the provider will perform a process of the acquirer and the acquirer will perform the process of the provider, is also valid.

In the following description, for ease of understanding, a following case may be used as an application example but not a limiting description: the data provider is a mobile data provider, the data acquirer is a bank, and in a specific case, there may also be a third party other than the data provider and the data acquirer, for example, the third party may indicate a software service provider as an intermediary to assist the data exchange process to be implemented. It should be understood that the data provider may include a direct or indirect data sender and the data acquirer may include a direct or indirect data receiver.

The data exchange method may be performed by a dedicated data exchange device or a general-purpose computing device. The device can be placed at any one of the data provider, the data acquirer, and the third party, or controlled by any one of the data provider, the data acquirer, and the third party. As an example, the data exchange method is performed at the data acquirer side, in other words, the device is controlled by the data acquirer (along with the third party). For example, the device is applied to a machine placed in a machine room of the bank, and in this case, the data of the mobile data provider shall temporarily exist on the machine of the bank, and the data (hereinafter referred to as the exchange sample) obtained after the data exchange method is performed completely may be stored directly on the local machine of the bank. As another example, the data exchange method is performed at the third party, in other words, the device is controlled by the third party such as the software service provider. In this case, the mobile data provider (or both the bank and the mobile data provider) provides the data to the third party, the third party performs the data exchange method, and then the third party provides the exchange sample to the bank. As another example, the data exchange method is performed at the data provider side, in other words, the device is controlled by the data provider. In this case, the data provider performs the data exchange method and then provides the exchange sample to the bank.

As shown in FIG. 1, in step S1100, a provider machine learning model is obtained. Here, the provider machine learning model is used to transform the data to be exchanged so as to obtain a feature vector through an operation such as a selection, a conversion, and/or a combination and so on under a machine learning algorithm. The feature vector is not recoverable, thus it is guaranteed that the data to be exchanged will not be exposed in plaintext, and, the transformed feature vector can be used for machine learning by the acquirer itself or via other parties, thus the purpose of data exchange is guaranteed. It should be noted that the machine learning described in the present invention generally refers to any data usage manner related to or similar to the machine learning (for example, data statistics, data mining, etc.), rather than being limited to the literal meaning of the machine learning.

According to an exemplary embodiment of the present invention, the provider machine learning model associated with the way the acquirer applies the machine learning may be obtained by any suitable manner, as long as a transformation result of the provider machine learning model can be applied to the machine learning of the acquirer.

As an example, an association model with similarity or relevance to the data usage of the acquirer in terms of an application scenario, a predicted content, and/or other aspects may be used as a "provider machine learning model". The association model may be the model trained in advance based on a set of the data similar to the data to be exchanged, or the association model may be the model obtained based on expert rules or business rules or the like. Here, the scene targeted by the association model may be the same as or similar to the scene faced by the acquirer (for example, a personalized recommendation involving the same or similar content). Or, the predicted content of the association model may be the same or similar to the acquirer's machine learning target problem (for example, both involve the probability that a certain user is interested in a certain content (for example, would click on a presented content)). Wherein, the features involved by the association model may have an intersection or association with the features of data samples of the provider. Such an association model can be obtained or generated by the provider, the acquirer, or other parties.

As another example, the provider machine learning model may also be learned based on the data samples from the provider, for example, the provider machine learning model is learned based on provider training samples from the provider in step S1100, wherein the provider machine learning model includes at least one of a supervised machine learning model, an unsupervised machine learning model and a semi-supervised machine learning model.

Those skilled in the art should understand that the data sample has corresponding respective feature, which may be derived from attribute fields of the data sample, for example, the feature may be a single attribute field, a part of an attribute field, combination of the single attribute field and/or the part of the attribute field, or may also be a result obtained by performing numerical processing (for example, discretization, logarithm, rounding, etc.) on the above items. In addition, the data sample may also have an identifier. The identifier may be a field or a key that plays a role of sample identification, for example, the identifier may be identification information such as a user's mobile phone number or identity card number, etc. With the identifier, the data samples (or a part of the data sample, such as a label, the feature, etc.) from different parties may be concatenated through the consistency or correspondence of the identifier.

Here, the provider training samples may be formed based on at least one part of the data samples from the provider for being used to learn the "provider machine learning model", which is used to transform the data sample to be exchanged for outputting the feature vector that may be applied to the machine learning by the acquirer. As an example applied to the machine learning, the acquirer may use such a feature vector to learn an "acquirer machine learning model", or input such a feature vector into a learned "acquirer machine learning model" to obtain a result of application of the model. As an example, when the feature vector is used by the acquirer, it may be combined with respective feature of the data sample from the acquirer's locality and/or other parties.

The machine learning algorithm used to learn "the provider machine learning model" may be selected according to need, may be a supervised machine learning algorithm, may also be an unsupervised machine learning algorithm, or may be a combination (for example, a semi-supervised machines learning algorithm) of both of the above, etc.

With regard to the supervised machine learning algorithm, as an example, it may be a deep neural network (DNN), a decision tree, a support vector machine, or the like. With regard to the unsupervised machine learning algorithm, as an example, it may be a deep neural network, a restricted Boltzmann machine, a clustering algorithm such as the k-nearest neighbor method KNN, or the like. With regard to the semi-supervised machine learning algorithm, as an example, it may be a deep neural network or the like.

Here, in the case of the supervised machine learning algorithm, in order to train the machine learning model, in addition to respective features of the data sample, it is also necessary to obtain the label, with respect to a problem of a machine learning target, of the data sample. Here, the label refers to a target value, with respect to the problem of the machine learning target, of a relevant data sample in history. For example, when training a machine learning model related to customer fraud, the label is used to identify whether there is a fraudulent behavior in a historical sample of respective customer. The method of obtaining the label is not limited, for example, the label may come from the data acquirer (such as the bank), may also come from the data provider (such as the mobile data provider), or may also come from other parties (such as a police system).

Correspondingly, the feature of the provider data sample and a corresponding label need to be concatenated to obtain the provider training sample for training a "the provider machine learning model" with respect to the problem of the machine learning target. Here, the feature and the label may be concatenated based on the identifier. For example, the bank may own historical fraud records for a large number of customers, but information of these customers registered in the bank are not sufficient, and the mobile data provider can provide supplemental attribute information of these customers. In this case, the label of the customer from the bank can be concatenated with the feature of the customer from the mobile data provider based on the identifier for the data sample of the customer to obtain a complete provider training sample.

Specifically, prior to step S1100, the method may further include the following step: acquiring the identifiers of at least one portion of the data samples from the acquirer and labels, with respect to the problem of the machine learning target, of the at least one portion of the data samples from the acquirer. Correspondingly, in step S1100, at least one part of the data samples having the identifiers acquired in the above step among the data samples of the provider are acquired, each data sample among the at least one part of the data samples is combined with the label corresponding to the identifier of the each data sample into a provider training sample, and the provider machine learning model is trained according to the supervised machine learning algorithm based on a set of the provider training samples. Here, some or all of the data samples with the corresponding label may be acquired to generate the provider training samples.

Furthermore, as a preferred approach, exemplary embodiments of the present invention may prevent training the "provider machine learning model" with improper data samples (provider data samples that are not temporally suitable for training). Specifically, according to an exemplary embodiment of the present invention, it may be defined that a feature generation time of the provider training sample should be suitable for a label generation time, thereby preventing a temporally later feature from being combined with a temporally preceding target for the training of the model (in other words, it is possible to prevent using a temporally newer feature to learn how to predict an old target).

Specifically, the acquiring of the labels may further include acquiring the label generation time corresponding to the label, and in step S1100, at least one part of the data samples, which have the acquired identifiers and whose sample generation time is suitable for (for example, earlier than) corresponding label generation time, among the data samples of the provider are acquired, and each data sample among the at least one part of the data samples is combined with the label corresponding to the identifier of the each data sample into the provider training sample. Here, for supervised machine learning, the trained "provider machine learning model" is capable of transforming the data to be exchanged which is expected to be output into an irreversible output feature vector having a meaning only for a target problem.

In step S1200, the provider machine learning model is used to transform output data samples to be provided to the acquirer among data samples of the provider into corresponding output feature vectors respectively. Specifically, the output data sample desired to be provided to the acquirer may be input to the "provider machine learning model" and output of the model is used as the output feature vector. Here, the "provider machine learning model" may transform the input data sample into an irreversible output feature vector, and such an output feature vector is particularly suitable for a particular usage scenario, for example the scenario which is the same with or similar to the scenario targeted by the provider machine learning model.

As an example, the output feature vector may be an intermediate result, a final result, or a vector into which the intermediate result and the final result are concatenated.

In one example, each output data sample may be input into the "provider machine learning model" and the intermediate result of the "provider machine learning model" for the each output data sample is used as the output feature vector corresponding to the each output data sample.

For example, in the case where the provider machine learning model is based on a deep neural network algorithm, node values of a middle layer (hidden layer) of the provider machine learning model for the each output data sample that is input may be used as the output feature vector corresponding to the each output data sample, the node values of a output layer may also be used as the output feature vector corresponding to the each output data sample, and the node values of a middle layer and the node values of a output layer may also be concatenated to be used as the output feature vector corresponding to the each output data sample.

For example, in the case where the provider machine learning model is based on a decision tree algorithm, a path (leaf node) from a root node to a target leaf node of the "provider machine learning model" for the each output data sample that is input may be encoded to be used as the output feature vector corresponding to the each output data sample.

For example, in the case where the provider machine learning model is based on a Support Vector Machine algorithm, a weight of a solution of a primal form of the provider machine learning model for each output data sample that is input may be used as the output feature vector corresponding to the each output data sample.

Here, the output data samples of the provider may be the data samples for learning the "provider machine learning model", and may also be other data samples expected to be exchanged, which may be used after transformation by the acquirer to perform corresponding machine learning, for example, model learning or model application.

Here, in the case that the output data sample is not the provider training sample, the "provider machine learning model" which is learned completely may be used to transform the output data sample into the corresponding output feature vector respectively. In other words, only after the learning process such as the training and so on of the "provider machine learning model" is completed, the output data sample is applied to the model, so that the corresponding output feature vector is obtained.

However, sometimes, there will be a problem such as the insufficiency of the amount of the samples, and the acquirer will further need to use that part of the data samples from which the "provider machine learning model" is trained. However, transformation results of this part of the data samples are difficult to effectively be applied to the machine learning of the acquirer. To solve this problem, as a preferred manner, when the provider training sample is used as the output data sample, it needs to be transformed into corresponding output feature vector during learning process of the model, that is, when the output data samples include the provider training samples, in step S1200, for the provider training sample, the provider machine learning model which is being learned is used to transform the provider training sample into the corresponding output feature vector respectively. For example, before model parameters are updated based on an operation result of a certain provider training sample, the provider machine learning model which is currently being learned is used to firstly convert the provider training sample into a corresponding output feature vector, and then to complete the update of the model parameters.

In step S1300, the transformed output feature vectors are combined with corresponding identifiers into exchange samples, wherein the exchange samples are able to be applied to the machine learning by the acquirer. Specifically, the exchange sample may be used by the acquirer to obtain the "acquirer machine learning model", or the exchange sample may be used by the acquirer to make a prediction using the "acquirer machine learning model". As an example, the exchange sample may be combined with other data sample by the acquirer for being applied to the machine learning. The other data sample here may be a local data sample of the acquirer corresponding to the exchange sample, or a data sample from other parties corresponding to the exchange sample, or a combination of them.

Here, when the machine learning is applied by the acquirer, the problem of the machine learning target which is same with or different from that of the provider may be targeted. For example, in the case where the supervised machine learning is applied by the provider, the exchange samples may be applied by the acquirer to the supervised machine learning with respect to the same machine learning target. In the case where unsupervised machine learning is applied by the provider, the exchange sample may be applied by the acquirer to the unsupervised machine learning, and may also be applied by the acquirer to the supervised machine learning or semi-supervised machine learning.

As an example, the exchange sample into which the identifier of the provider training sample from which the "provider machine learning model" is learned and a corresponding output feature vector are combined is able to be used by the acquirer to learn the "acquirer machine learning model".

Correspondingly, for example, the acquirer may concatenate the exchange sample with the acquirer's local data sample based on the identifier of the exchange sample described above and use the concatenated complete training sample to learn the "acquirer machine learning model".

Preferably, the machine learning algorithm used to obtain the provider machine learning model is the same as the machine learning algorithm used by the acquirer to obtain the acquirer machine learning model, so that machine learning logics of the provider and the acquirer are more consistent, so that transformed original data can be applied to the acquirer better, that is, the purpose of the data exchange can be completed more effectively.

Here, in the case where the "provider machine learning model" is trained based on the supervised learning algorithm, after acquiring the exchange sample, the acquirer (for example, the bank) may search for a corresponding historical data sample in local (or from other parties) based on the identifier of the exchange sample, combine the label of the historical data sample and features extracted from the exchange sample and the corresponding historical data sample into a complete training sample, so as to train the "acquirer machine learning model" based on sufficient features of the customer. Wherein, when the features are combined, various linear combinations and/or non-linear transformations may be performed on the features. Here, the exchange sample may be applied by the acquirer to the machine learning with respect to the same machine learning target, that is to say, the acquirer uses the complete training sample to train the "acquirer machine learning model" with respect to the machine learning target problem of the "provider machine learning model".

In addition, the provider may also provide other output data samples, and the exchange samples into which identifiers of these output data samples are combined with the corresponding output feature vectors are not only able to be used by the acquirer for the learning of the model (in the case that the acquirer has corresponding labels), but also able for the application of the model, that is, the acquirer may use such an output feature vector to learn the "acquirer machine learning model", or input it into the learned "acquirer machine learning model" to obtain an output result of the model. That is, according to needs, transformation results of the provider training samples may be used to learn the "acquirer machine learning model", transformation results of the other output data samples may also be used to learn the "acquirer machine learning model", and the "acquirer machine learning model" may also be learned according to both of them together, and the like. Here, according to an exemplary embodiment of the present invention, in the case that an exchange mechanism is determined, it may be set specifically which data samples are to be exchanged and for what purpose the data samples are used according to an actual situation.

Correspondingly, for example, the acquirer may concatenate the exchange sample with its local data sample based on the identifier of the exchange sample for the application of the model and input a concatenated complete sample for the application into the learned "acquirer machine learning model".

Here, taking the supervised machine learning related to the bank fraud as an example again, after the bank obtains the "acquirer machine learning model", the "acquirer machine learning model" may be used for making a prediction with respect to the sample of a new customer. In this case, the bank may use the combination of the exchange sample and local data as a prediction sample. As an example, the specific process may be as follows: for a new customer, the bank provides the identifier (for example, the mobile phone number) of the customer to the mobile data provider, and the mobile data provider acquires mobile data of the customer based on the identifier of the customer, inputs the mobile data to the "provider machine learning model", and then obtain the transformed output feature vector; the transformed output feature vector is combined with the identifier of the customer into the exchange sample to be provided to the bank; the bank inputs the exchange sample in combination with local customer data to the previously obtained "acquirer machine learning model", thereby obtaining a prediction about whether the customer is fraudulent.

As a preferred manner, in step S1300, in addition to the identifier and the output feature vector, the exchange sample further includes an output data sample generation time, so as to identify the generation time of a relevant attribute field involved in the output data sample. Specifically, the transformed output feature vector, the corresponding identifier, and corresponding output data sample generation time are combined into the exchange sample. In this way, the acquirer can determine whether it is appropriate to use the exchange sample according to the output data sample generation time, thereby ensuring timeliness of applying the machine learning.

According to the exemplary embodiment described above, the original data to be exchanged is transformed into vector information that is not recoverable but is applicable to the machine learning, so that on the one hand, data can be guaranteed to be efficiently used for the machine learning, and on the other hand, the original data can be prevented from being used, sold or leaked without authorization.

As an example, the above method may be performed by the provider, and correspondingly, after step S1300, the method further includes: providing the exchange samples to the acquirer for being applied to the machine learning.

As another example, the method may be performed by a third party other than the provider and the acquirer, in this case, in order to further secure the provider data, respective feature of the provider training sample and/or the output data sample is subjected to a hash transformation so that the third party cannot get the original text of the provider data and can still transform it into a valid output feature vector. Correspondingly, after step S1300, the method further includes: providing the exchange samples to the acquirer for being applied to the machine learning.

As another example, the method may be performed by the acquirer, in this case, in order to further ensure that the original text of the provider data is not exposed, the provider training sample and/or the output data sample is encrypted, wherein the acquirer decrypts the encrypted provider training sample and/or the encrypted output data sample and performs the step S1100 and the step S1200, by calling a service provided by the third party other than the provider and the acquirer. It can be seen that: although a decryption process, a model training process, and a data conversion process are performed at the acquirer, since they are executed by calling the service of the third party, the original data of the provider is neither exposed to the acquirer nor taken away by the third party, thereby ensuring the security of the data.

In addition, no matter at which party the method of FIG. 1 is performed, since the data sample often involves customer information, a corresponding identifier generally indicates an item of customer identification information (for example, private information such as the mobile phone number, the identity card number and so on), in order to ensure the privacy of the user being leaked, the identifiers of the at least one portion of the data samples from the acquirer are subjected to a same hash transformation as the identifiers of the data samples of the provider, so that corresponding user identification information may also not be exposed as for the data sample which has not been concatenated completely.

Examples of cases where the data exchange method is performed at the provider side, the third party side, and the acquirer side will be described below with reference to the accompanying drawings. It should be noted that the exemplary embodiments of the present invention are not limited to specific embodiments shown in the following figures, but corresponding changes, omissions, or substitutions may be made in various aspects such as selection of the data sample, setting of exchange timing, usage mode of the data, and learning or application of the model and so on, according to the need.

Figure 2:
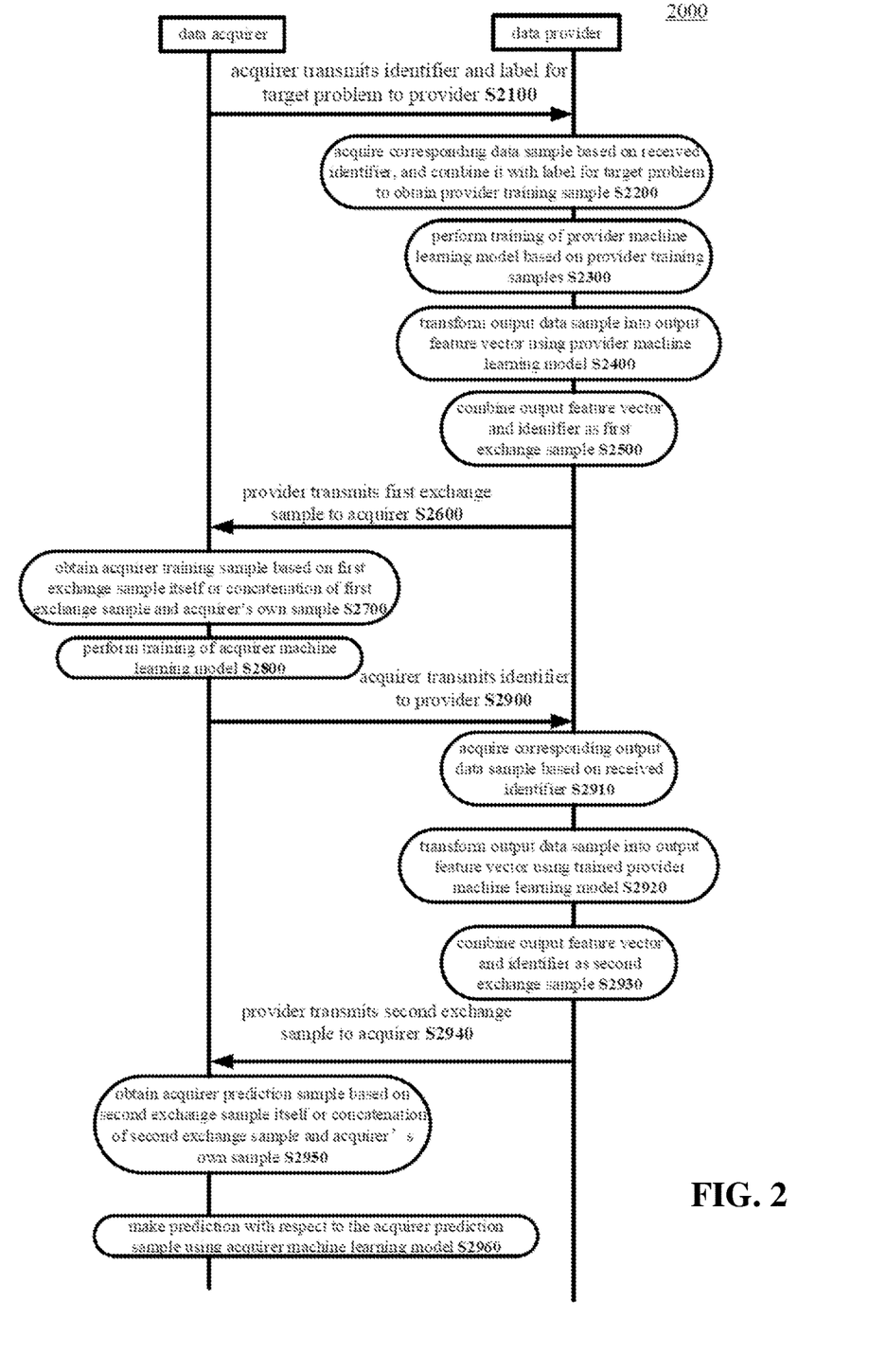
FIG. 2 illustrates a sequence diagram of a case where a data exchange method 2000 is performed at a data provider side according to an embodiment of the present invention.

FIG. 2 illustrates a sequence diagram of a case where a data exchange method 2000 is performed at a data provider side according to an embodiment of the present invention.

Firstly, taking the case of acquiring the "provider machine learning model" by the supervised machine learning based on data learning of the provider as an example, in step S2100, the data acquirer transmits the label, with respect to the problem of the machine learning target, of the data sample together with the identifier of the data sample, to the provider.

For example, the label with respect to the target problem here may indicate the target value to be predicted by machine learning. The data acquirer may provide the data provider with the label of each historical sample and the identifier (ID) corresponding to each label. For example, assuming that a bank expects to use a machine learning model to predict whether a customer will commit fraud, the bank would expect to obtain supplemental information of the customer from an external source (for example, the mobile data provider) to improve training features of the machine learning model. To this end, the bank as a data acquirer may transmit the value of the label of respective existing historical fraud sample (including positive sample and negative sample) and the corresponding identifier (for example, the mobile phone number of the customer) to the mobile data provider (the data provider).

Here, the identifier is used to complete the concatenation of the features and/or the labels of the data samples between the data provider and the data acquirer. However, not all the data samples have corresponding sample that can be concatenated thereto, therefore, in order to prevent the data provider leaking the identification information of the sample of the data acquirer, the data acquirer may perform hash transformation on the identifier of the historical sample, and then transmit the identifier of the sample which is subjected to the hash transformation together with the label for a corresponding problem of the target to the data provider. For example, in order to avoid leakage of the user's private information, the bank may provide the user's mobile phone number which is subjected to the hash transformation to the mobile data provider.

In one example, as a preferred manner, the data acquirer further transmits a label generation time corresponding to the label to the data provider, to identify the generation time of a fraud record of the customer. This is because, in order to ensure results of training of the model, the generation time of the label may be limited to be not earlier than feature generation time of the training sample, that is to say, it is avoided to use a newer feature to learn how to predict an old learning target.

Next, in step S2200, the data provider searches the data samples of the provider for corresponding data sample based on the received identifier of the sample, and combines the feature of the searched sample with the label for the problem of the target to obtain the provider training sample.

Here, in the case where the received identifier of the acquirer sample is subjected to the hash transformation, the data provider needs to perform the same hash transformation on the identifier of its own data sample in order to perform pairing of the identifiers of the samples, and then the data provider can obtain the provider data sample corresponding to the label of the acquirer from, for example, a local or remote database.

In addition, matching data samples may be further filtered optimally. For example, after the label generation time corresponding to the label is obtained by the data provider, for the provider data sample matching with the identifier, the label generation time and the generation time of the matching sample may be compared and only samples whose sample generation time is not later than the label generation time are reserved.

Then, in step S2300, the data provider performs the training of the provider machine learning model based on the obtained provider training samples.

For example, the mobile data provider uses a deep neural network algorithm for the training of the model based on the concatenated provider training samples, to determine structure and parameters of the deep neural network, such as the number of hidden layers, weights of the nodes, and the like. Here, the deep neural network is a typical algorithm of a deep machine learning method, and it may be applied to transform the data in a certain extent according to an exemplary embodiment of the present invention, so that a transformed result is still applicable to corresponding machine learning.

After the provider machine learning model is trained, in step S2400, the output data sample is transformed into the output feature vector using the provider machine learning model.

Here, as described above, the output data sample may be the provider training sample. At this time, it needs to be transformed during the training of the model. In addition, the output data sample may also be other data samples that have not participated in the training of the provider machine learning model, that is to say, for the provider data samples with a matching label, only one part of them may be used for the training of the "provider machine learning model" and another part of them is used for the training of the "acquirer machine learning model" after being transformed. At this time, the other part can be transformed after the training of the model is completed. Of course, the output data sample may also include all or part of the above both parts.

As an example, in the case that the deep neural network algorithm is used as the machine learning algorithm, the output feature vector of the output data sample may be obtained by: inputting respective feature of each output data sample into a deep neural network model such that each node in each middle layer (also called hidden layer) of the depth neural network has a corresponding node value, and each node in its output layer also has a corresponding node value. The node values of all middle layer nodes may be used as a feature component value of respective dimension of the output feature vector. For example, as a simplified example, it is assumed that there are three middle layers: the first, second, and third middle layers, and they have 10, 20, and 15 nodes respectively, that is to say, the node values of a total of 10+20+15=45 middle layer nodes may be obtained, accordingly, these node values may be combined into a 45-dimensional output feature vector. Alternatively, the node value of the middle layer node together with the node value of an output layer node may also be used as the output feature vector. For example, there are 45 middle layer nodes in the above example, in addition, there are also 10 output layer nodes, i.e., there are a total of 55 nodes in the middle layers and the output layers, correspondingly, a 55-dimensional output feature vector may be obtained. In addition, alternatively, a part of node values of nodes of the intermediate layers and/or nodes of the output layers may be selected to form the output feature vector.

Next, in step S2500, the data provider combines the output feature vector and the corresponding identifier as the first exchange sample.

As required, the data provider may also provide the output data sample generation time, for example, combines the identifier of the output data sample, the output data sample generation time, and the corresponding output feature vector into the first exchange sample.

Then, in step S2600, the data provider transmits the first exchange sample to the acquirer.

It is illustrated that the data exchange method according to an embodiment of the present invention is performed at the data provider side, by taking the supervised machine learning as an example in conjunction with FIG. 2 above, but this is only an example, and feature learning and categorization on the output data samples may also be performed by the unsupervised machine learning at the data provider, as required. At this time, it is not necessary to receive a label value of the sample from the acquirer.

Subsequent steps S2700-S2960 of FIG. 2 describe an example of operations that the acquirer may perform after acquiring the first exchange sample according to an embodiment of the present invention.

In step S2700, the data acquirer obtains an acquirer training sample based on the first exchange sample itself or the concatenation of the first exchange sample and the acquirer sample.

Specifically, the acquirer (for example, the bank) may search for a corresponding historical data sample in local (or from other parties) based on the identifier of the first exchange sample after receiving the first exchange sample, and combine the label of the corresponding historical data sample and the feature extracted from the first exchange sample (or along with the corresponding historical data sample) into a complete acquirer training sample.

Then, in step S2800, the data acquirer performs the training of the acquirer machine learning model based on the acquirer training samples.

Preferably, the data acquirer may perform the training of the machine learning model based on the same machine learning target. For example, in the previous example, the mobile data provider performs the training of the provider machine learning model by judging whether the user is fraudulent or not; here, as the data acquirer, the bank also perform the training of the acquirer machine learning model by making the learning target as predicting whether the user is fraudulent or not. In this way, the data acquirer may use the exchange samples to achieve a better effect, since the exchange sample is converted by using the machine learning model for the learning target and thus is more targeted to this learning target.

Preferably, the type of the machine learning algorithm employed by the data acquirer is the same as the type of the machine learning algorithm of the data provider, however, this is not necessary and they may be different.

In step S2900, the acquirer transmits the identifier of the sample expected to be predicted to the provider.

For example, after training the acquirer machine learning model, when the bank wants to predict whether a new customer will be fraudulent, it may wish to make a prediction in conjunction with the external data (for example, exchange data from the data provider) of the customer, accordingly, the bank may transmit the identifier (for example, the mobile phone number) of the customer to the mobile data provider. Similarly, in order to prevent privacy leakage, the identifier may also be subjected to the hash transformation.

In step S2910, the data provider acquires a corresponding output data sample based on the received identifier of the sample.

For example, the mobile data provider searches the data samples of the mobile data provider for the corresponding sample of the customer based on the received identifier of the customer. Similarly, in the case that the received identifier of the acquirer sample is subjected to the hash transformation, the mobile data provider also needs to perform the same hash transformation on the identifier of its own sample, to search for a matching sample of the customer.

In step S2920, the feature of the searched output data sample is transformed into the output feature vector using the previously trained provider machine learning model.

For example, the mobile data provider inputs the feature of the new customer into the previously trained deep neural network, and then obtains the output feature vector for prediction according to the rule for previously acquiring the output feature vector for training.

In step S2930, the provider combines the output feature vector and the corresponding identifier as a second exchange sample.

In step S2940, the provider transmits the second exchange sample to the acquirer.

In step S2950, in a manner similar to the step S2700, the acquirer obtains an acquirer prediction sample based on the second exchange sample itself or the concatenation of the second exchange sample and the acquirer's own sample.

In step S2960, the acquirer makes a prediction with respect to the acquirer prediction sample using the previously trained acquirer machine learning model.

For example, the bank inputs feature data of the acquirer prediction sample of the customer into the trained acquirer machine learning model, to obtain a prediction value about whether the customer will be fraudulent.

FIG. 2 illustrates the sequence diagram of the data exchange method being performed at the data provider side using the supervised learning algorithm as an example. This is only an example, and some steps can be deleted, modified, or added according to needs and actual conditions.

For example, in the case of the unsupervised learning algorithm, the transmission of the label with respect to the target problem in step S2100 may be omitted. In addition, in the above case, the data provider may also be requested once to convert all the data samples of the data provider into the feature vector in a manner such as categorization and so on, and transmit all the converted exchange samples to the data acquirer for subsequent use. In this case, step S2100 may be omitted entirely. In addition, in the case that the identifier of the sample is not specified, selection of the sample may also be performed by the data provider in step S2200, and when selecting, reference may be made to some limitations, for example occupation, income range, housing condition and the like, proposed by the data acquirer.

An example of a case where the data exchange method 3000 according to an embodiment of the present invention is performed at the third party is described below with reference to FIGS. 3a-3b.

Figure 3A:
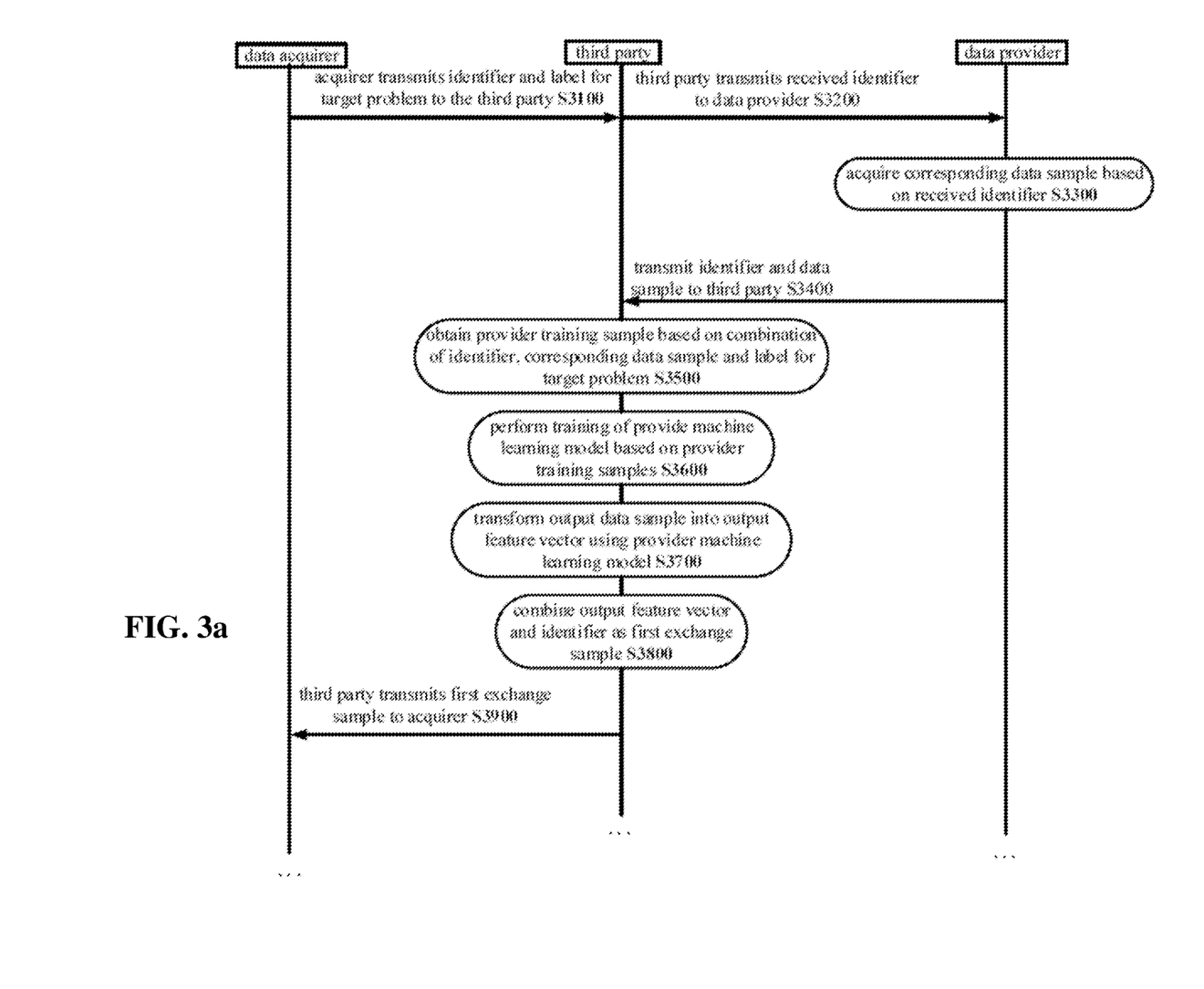
FIGS. 3a to 3b illustrate a sequence diagram of a case where a data exchange method 3000 is performed at a third party according to an embodiment of the present invention.
Figure 3B:
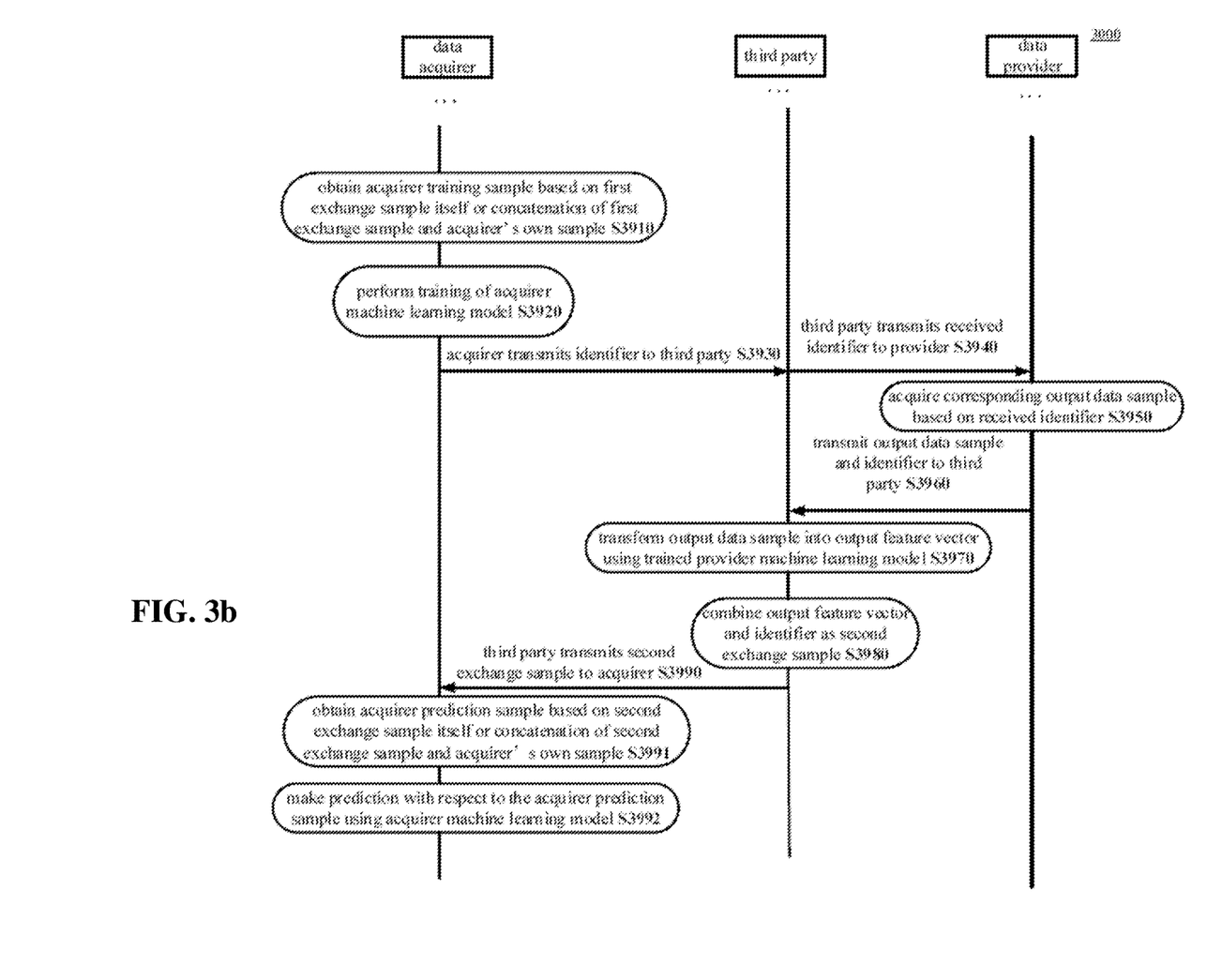

As can be seen by comparing FIGS. 3a-3b with FIG. 2, a main difference between the data exchange method being performed at the third party and the data exchange method being performed at the data provider is that: when the data exchange method is performed at the third party, relevant data and information are to be transferred from the acquirer and/or the provider to the third party, the third party performs the training of the provider machine learning model, and the third party acts as an intermediary to transfer information and data between the acquirer and the provider. Hereinafter, descriptions will be omitted for the same technical details.

In step S3100, the acquirer transmits the label for a target problem and a corresponding identifier to the third party. Here, in order to prevent the identifier of the data sample from being leaked to the third party, the acquirer may previously perform the hash transformation on the identifier. At this point, the acquirer should reach an agreement with the provider in advance that both of them use the same hash transformation algorithm, so that the identifier can still help to complete the concatenation, but the third party or other parties cannot obtain original information content of the identifier.

In step S3200, the third party transmits the received identifier of the sample to the data provider.

In step S3300, the data provider acquires a corresponding data sample to be exchanged based on the received identifier of the sample.

In step S3400, the data provider transmits the acquired data sample and the corresponding identifier to the third party.

Here, in order to ensure that the data sample transmitted to the third party is not exposed to the third party in plaintext, the features of the data sample may be subjected to the hash transformation. For example, the hash transformation may be performed on respective feature of the data sample after the data sample is acquired in the step S3300. Of course, it is also possible to perform the hash transformation on the respective feature of the sample earlier. In this way, even if the third party has obtained the data sample, it does not know the meaning of the feature of the sample. However, such a feature of the sample that is subjected to the hash transformation may still be used to perform meaningful machine learning, which is a particular advantage of data transformation by the machine learning algorithm and then exchanging data in the embodiment of the present invention.

It should be explained that the hash transformation may be performed on both the identifier and the features of the sample, or the hash transformation may be performed on only the identifier or the features of the sample; and when the hash transformation is performed on the features of the sample, the hash transformation may be performed only on some important features.

In step S3500, the third party combines the received data sample and identifier thereof with a corresponding label for the target problem to obtain the provider training sample.

In step S3600, the third party performs training of the provide machine learning model based on the provider training samples.

In step S3700, the third party transforms the provider training sample as the output data sample into the output feature vector using the provider machine learning model. Here, in order to ensure that the output feature vector may be applied to the machine learning of the acquirer, the provider training sample needs to be transformed during the training of the provider machine learning model.

In step S3800, the third party combines the output feature vector and the corresponding identifier as the first exchange sample.

In step S3900, the third party transmits the first exchange sample to the acquirer.

It is illustrated that a data exchange algorithm according to an embodiment of the present invention is performed at a third party, by taking the supervised machine learning as an example in conjunction with FIG. 3a above, but this is only an example. According to needs, the feature learning and the categorization on the sample to be exchanged may also perform by the unsupervised machine learning at the third party. At this time, it is not necessary to receive the label value of the sample from the acquirer.

FIG. 3b may be considered as a continuation of FIG. 3a, which describes an example of operations that the acquirer may perform after acquiring the first exchange sample according to an embodiment of the present invention.

In step S3910, the acquirer obtains the acquirer training sample based on the first exchange sample itself or the concatenation of the first exchange sample and the acquirer's own sample.

In step S3920, the acquirer uses the acquirer training sample to perform the training of the acquirer machine learning model.

In step S3930, the acquirer transmits the identifier of a desired sample to the third party. Here, the desired sample may be the sample simply desired to be made a prediction using the "acquirer machine learning model".

In addition, as an alternative manner, the desired sample may also be a set of both the sample desired to be used for training the "acquirer machine learning model" and the sample desired to be applied to the "acquirer machine learning model". In this case, as an example, it may be also considered to omit steps S3700 to S3920 (or to omit only steps S3910 and S3920) and to perform both the training and the application of the "acquirer machine learning model" completely based on "second exchange sample" including not only a training sample but also a prediction sample described below.

In step S3940, the third party transmits the identifier of the desired sample to the provider.

In step S3950, the provider acquires a corresponding output data sample based on the received identifier of the sample.

In step S3960, the provider transmits the acquired output data sample together with the corresponding identifier to the third party.

In step S3970, the third party transforms the feature of the output data sample into the output feature vector using the previously trained provider machine learning model.

In step S3980, the third party combines the output feature vector and the corresponding identifier as the second exchange sample.

In step S3990, the third party transmits the second exchange sample to the acquirer.

In step S3991, the acquirer obtains the acquirer prediction sample based on the second exchange sample itself or the concatenation of the second exchange sample and the acquirer's own sample.

In addition, in the above alternative manner, the acquirer may also obtain the acquirer training sample based on the second exchange sample itself with a corresponding label or the concatenation of the second exchange sample and its own sample and perform the training of the model based on these acquirer training samples (or together with the previously acquired first exchange sample).

In step S3992, the acquirer makes a prediction with respect to the acquirer prediction sample using the acquirer machine learning model.

With regard to steps S3910 to S3992, the identifier of the sample and the feature of the sample may also be subjected to the hash transformation to prevent information from being obtained by the third party in plaintext.

FIGS. 3a and 3b illustrate the sequence diagram of the data exchange method being performed at the third party by taking the supervised learning algorithm as an example. This is only an example, and some steps may be deleted, modified, or added according to needs and actual conditions. For example, an unsupervised learning algorithm may be used to perform the data exchange method at the third party.

For example, in the case of the unsupervised learning algorithm, the transmission of the label with respect to the target problem in step S3100 may be omitted. In addition, in the above case, the data provider may also be requested once to convert all the data samples of the data provider into the feature vector through a manner such as categorization and so on, and transmit all the converted exchange samples to the data acquirer for subsequent use. In this case, step S3100 can be omitted entirely. In addition, in the case that the identifier of the sample is not specified, the provider may decide on its own to provide data of which samples to the acquirer. For example, in step S3100 and step S3200, filtering conditions for the exchange data, which is specified by the acquirer, may be transmitted. Here, as an example, the conditions are, for example, the occupation, the income range, the registered permanent residence, the housing condition, and the like.

In addition, even for the case of matching the data samples based on the identifier, alternative other manners may also be used. For example, in FIGS. 3a to 3b, the acquirer transmits a desired identifier to the provider through the third party, and the provider searches for a corresponding data sample to be exchanged from its own data samples according to the received identifier. However, it is also possible to reach an agreement that the identifiers of all exchangeable data samples are provided by the provider once or continuously to the third party or the acquirer, and data filtering is completed by the third party or the acquirer, thereby determining the data samples for training and the data samples for prediction that will actually be exchanged.

In the above example, although the acquirer may complete the data exchange by means of a trusted third party, in practice, it is often desired that the data exchange method is performed directly at the acquirer, for example, in the machine room of the bank, and in this case, it is possible to really ensure that data of the bank will not be leaked.

Next, an example of a case where the data exchange method 4000 according to an embodiment of the present invention is performed at the acquirer will be described with reference to FIG. 4. The same details will not be repeated one by one.

In step S4100, the acquirer transmits the label for a target problem and a corresponding identifier to the provider, and the label for the target problem and the corresponding identifier here are used to search for a training sample for the provider machine learning model. In step S4200, the provider acquires a corresponding data sample based on the received identifier of the sample. In step S4300, the provider transmits the feature of the acquired data sample and the corresponding identifier to the acquirer.

Figure 4:
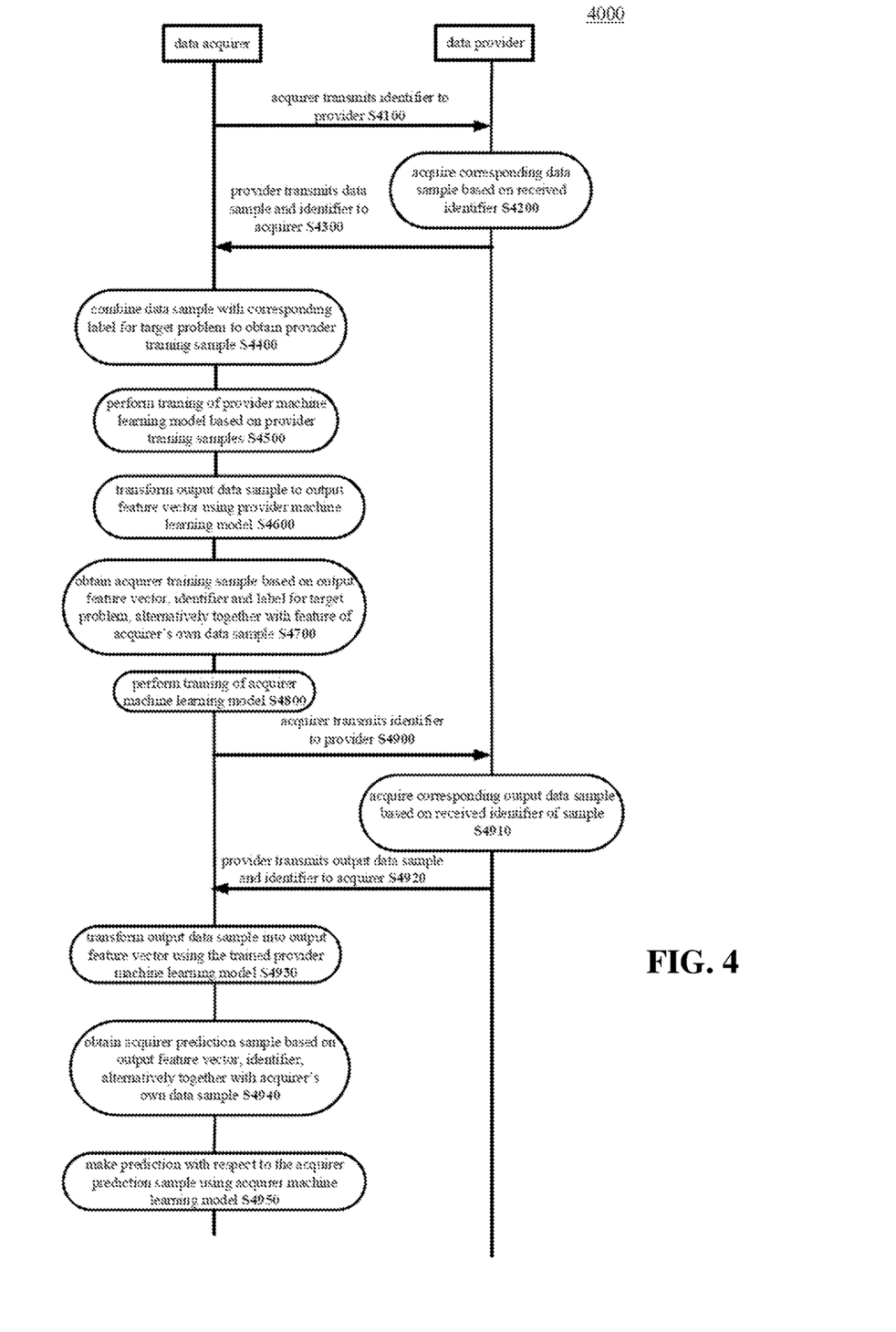
FIG. 4 illustrates a sequence diagram of a case where a data exchange method 4000 is performed at an acquirer according to an embodiment of the present invention.

Similarly, the identifier and/or the feature in the above steps of FIG. 4 may be subjected to the hash transformation so as to ensure data security. In addition, it should be noted that, similar to the cases of FIGS. 3a and 3b, the manner in which the identifier of an exchangeable data sample is firstly provided by the provider may be employed to replace the manner in which the identifier of the data sample of interest is firstly provided by the acquirer.

On this basis, since the data exchange method is performed at the acquirer, the provider may encrypt the data sample before providing the data sample to the acquirer, in order to ensure that the data of the provider is more secure.

In one example, the data to be exchanged is also subjected to the hash transformation before being encrypted.

In step S4400, the acquirer combines the feature of the received data sample with the corresponding label for the target problem based on the received identifier to obtain the provider training sample.

When the feature of the data sample is encrypted, the acquirer may decrypt the received data sample by calling a service of the third party without knowing a decryption method, thereby obtaining the provider training sample. Here, since the service for the decryption of the third party is performed at the acquirer and the decrypted data will also be converted at the acquirer through the service of the third party, thus, neither the third party nor the acquirer will obtain the exchanged data in plaintext. In this way, the data acquirer and/or the third party cannot leak or abuse the data to be exchanged.

In step S4500, the data acquirer calls the service of the third party to perform the training of the provider machine learning model based on the provider training samples.

In step S4600, the acquirer calls the service of the third party to transform the provider training sample as the output data sample to the output feature vector using the trained provider machine learning model. Here, the transformation needs to be done during the training of the model.

In step S4700, the acquirer obtains corresponding label for the target problem with reference to the output feature vector and the identifier thereof, and further obtains the acquirer training sample alternatively together with the feature of the acquirer's own corresponding sample. Here, after the acquirer obtains the output feature vector, it needs to refer to the identifier of the output feature vector to finally obtain the acquirer training sample. The above process may be regarded as the case that the acquirer combines the identifier of the data sample to be exchanged with the corresponding output feature vector into the exchange sample physically or logically for being applied to the machine learning.

In step S4800, the acquirer performs the training of the acquirer machine learning model.

In step S4900, the acquirer transmits the identifier of a desired sample to the provider. In the case where the steps S4700 and S4800 described above are performed, the desired sample here may indicate only the prediction sample.

In addition, as an alternative manner, in the case where the exchangeable samples are sufficient, step S4600 as well as step S4700 and step S4800 may be omitted. That is, where the training of the acquirer machine learning model has not been performed, the desired sample here may include both the training sample and the prediction sample of the acquirer.

In step S4910, the provider acquires a corresponding data sample to be exchanged based on the received identifier of the sample. In step S4920, the provider transmits the acquired data sample and the corresponding identifier to the acquirer. In step S4930, the acquirer transforms the feature of the data sample into the output feature vector using the trained provider machine learning model. In step S4940, the acquirer obtains the acquirer prediction sample based on the output feature vector itself or the concatenation of the output feature vector and the acquirer's own sample.

In addition, in the alternative manner, the acquirer may firstly obtain the acquirer training sample based on the output feature vector itself with the corresponding label or the concatenation of the output feature vector and the acquirer's own sample, together with the corresponding label, and then perform the training of the model based on these acquirer training samples. In addition, the acquirer then obtains the acquirer prediction sample based on the output feature vector itself for prediction or the concatenation of the output feature vector and the acquirer's own sample.

In step S4950, the acquirer makes a prediction with respect to the acquirer prediction sample using the acquirer machine learning model. Here, it should be noted that, preferably, in the steps S4800 to S4950, similar hash transformation and/or encryption process may be performed for the identifier, the data sample to be exchanged, and the like, and processes such as decryption, prediction, etc. may be performed by the service of the third party.

FIG. 4 illustrates the sequence diagram of the data exchange method executed at the acquirer by taking the supervised learning algorithm as an example. This is only an example, and some steps may be deleted, modified, or added according to needs and actual conditions. For example, the unsupervised learning algorithm may be used to perform the data exchange method at the acquirer.

With the data exchange method according to the embodiment of the present invention, the provider machine learning model may transform input data to be exchanged into the output feature vector that is not recoverable, has significance for the machine learning, but lacks effective information for other usage scenarios, thereby not only ensuring an usage purpose that the exchanged data may be used for the data acquirer, but also preventing the exchanged data from being leaked or abused by the data acquirer or other malicious parties. As an example, the output feature vector may be an intermediate prediction result, a final prediction result, or a vector concatenated by the intermediate prediction result and the final prediction result. In addition, it should be noted that, no matter for which case, the provider may perform the hash transform on the feature of the data sample in advance, and the feature that is subjected to the hash transformation can be directly used to train the provider machine learning model.

Figure 5:
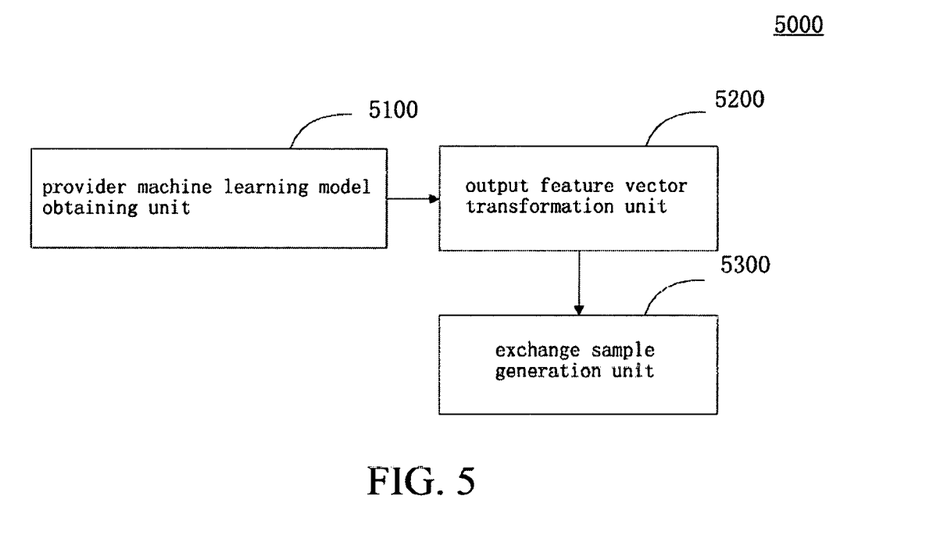
FIG. 5 illustrates a functional block diagram of a data exchange device 5000 according to another embodiment of the present invention.

FIG. 5 illustrates a functional block diagram of a data exchange device 5000 according to another embodiment of the present invention. The data exchange device includes: a provider machine learning model obtaining unit 5100 configured to obtain a provider machine learning model; an output feature vector transformation unit 5200 configured to transform output data samples to be provided to the acquirer among data samples of the provider into corresponding output feature vectors respectively, using the provider machine learning model; and an exchange sample generation unit 5300 configured to combine the transformed output feature vectors with corresponding identifiers into exchange samples, wherein the exchange samples are able to be applied to the machine learning by the acquirer.

It should be noted that the above-mentioned data exchange device can realize corresponding functions completely based on execution of computer programs, that is to say, each unit functions as a module corresponding to each step of the flowchart of the method in a functional architecture of the computer programs, so that the entire device is called by a dedicated software package (for example, a lib library) to implement the functions or operations defined in the various steps described above with reference to the flowchart of the method.

On the other hand, respective unit described above may also be implemented by hardware, software, firmware, middleware, microcode, or any combination thereof. When implemented in the software, the firmware, the middleware, or the microcode, program codes or code segments for performing required tasks may be stored in a computer readable medium such as a storage medium, and the processor may perform the required tasks.

Here, an embodiment of the present invention may be implemented as a computing device, including a storage component having a set of computer executable instructions stored therein, and a processor, wherein, when the set of the computer executable instructions is executed by the processor, the data exchange method described above is performed.

Figure 6:
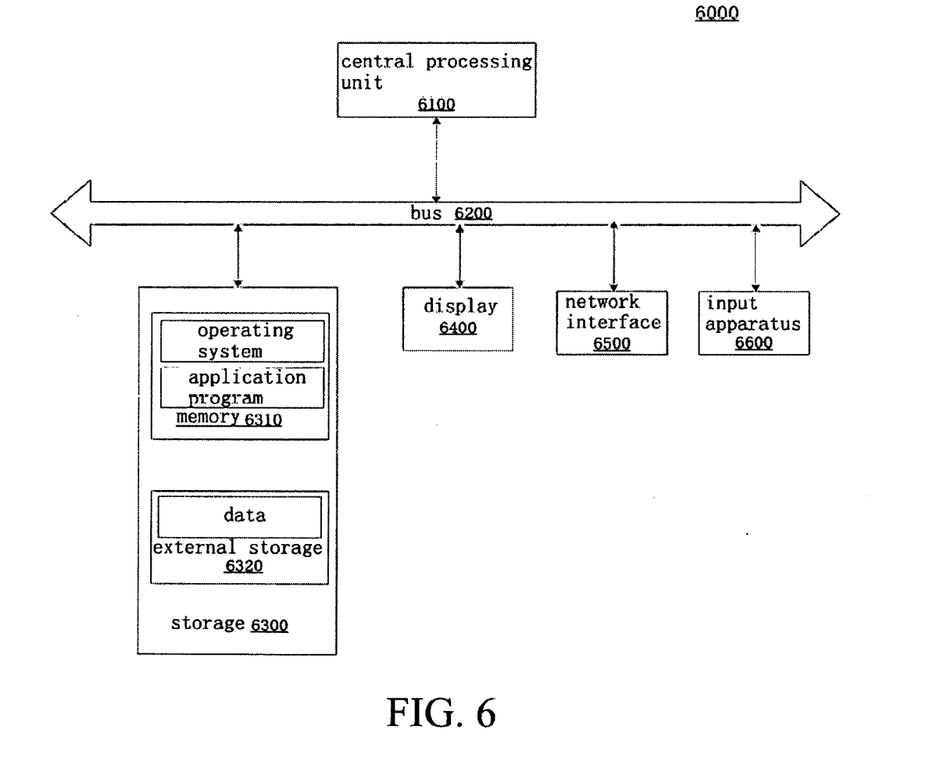
FIG. 6 illustrates a block diagram of a configuration of a computing device 6000 according to an embodiment of the present invention.

FIG. 6 illustrates a block diagram of a configuration of a computing device 6000 according to an embodiment of the present invention.

As shown in FIG. 6, the computing device 6000 includes a central processing unit 6100, a storage 6300, a display 6400, a network interface 6500, and an input apparatus 6600 that may be connected by wire or wirelessly. The storage 6300, the display 6400, the network interface 6500, and the input apparatus 66W are connected to the central processing unit 6100 via the bus 6200. The storage 6300 includes a memory 6310 and an external storage 6320. In the normal operation of the computing device 6100, an operating system and various application programs reside in the memory 6310. The external storage 6320 may be a ROM, a hard disk or a solid state disk, and may store BIOS, data, applications, etc. thereon.

The storage stores a set of computer instructions capable of implementing the data exchange method of the embodiment of the present invention. When the set of the computer instructions is executed by the central processing unit, the data exchange method according to the embodiment of the present invention is performed. It should be noted that the central processing unit here may be a physically or logically distributed computing cluster and is not limited to a stand-alone computing apparatus.

Specifically, according to an embodiment of the present invention, there is provided a computing device for data exchange between a provider and an acquirer with respect to machine learning, which includes a storage component having a set of computer executable instructions stored therein, and a processor, wherein, when the set of the computer executable instructions is executed by the processor, following steps are performed: a provider machine learning model obtaining step, for obtaining a provider machine learning model; an output feature vector transformation step, for transforming output data samples to be provided to the acquirer among data samples of the provider into corresponding output feature vectors respectively, using the provider machine learning model; and an exchange sample generation step, for combining the transformed output feature vectors with corresponding identifiers into exchange samples, wherein the exchange samples are able to be applied to the machine learning by the acquirer. It should be noted that the set of computer executable instructions may be configured to perform all the operations and functions described above with reference to the flowchart of the method, which will not be described in detail herein.

Various embodiments of the present invention have been described above. The above description is exemplary, not exhaustive, and is not limited to the disclosed respective embodiment. Many modifications and variations will be apparent to those of ordinary skill in the art without departing from the scope and spirit of the illustrated embodiments. Therefore, the protection scope of the present invention should depend on the protection scope of the claims.

The invention claimed is:

1. A method for data exchange between a data provider and a data acquirer with respect to machine learning, the method comprising: (a) obtaining a provider machine learning model; (b) transforming output data samples among data samples of the provider into corresponding output feature vectors respectively, using the provider machine learning model, wherein the output data samples are to be provided from the provider to the acquirer; and (c) combining the transformed output feature vectors with corresponding identifiers identifying the data samples into exchange samples, wherein the exchange samples are able to be applied to the machine learning by the acquirer so that the exchange samples are able to be acquired and used by the acquirer to obtain an acquirer machine learning model, or the exchange sample is able to be acquired and used by the acquirer to make a prediction using the acquirer machine learning model, wherein the exchange sample is able to be concatenated, by the acquirer, with a local data sample corresponding to the exchange sample based on the identifier of the exchange sample and the concatenated sample is used by the acquirer to obtain the acquirer machine learning model or is used by the acquirer to make a prediction using the acquirer machine learning model.

2. The method of claim 1, wherein step (a) comprises: learning the provider machine learning model based on provider training samples from the provider, wherein the provider machine learning model comprises at least one of a supervised machine learning model, an unsupervised machine learning model and a semi-supervised machine learning model.

3. The method of claim 2, wherein the output data samples contain the provider training samples, and in step (b), for the provider training sample, the provider machine learning model which is being learned is used to transform the provider training sample into the corresponding output feature vector respectively.

4. The method of claim 2, wherein in step (b), for the output data sample that is not the provider training sample, after the learning process of the provider machine learning model is completed, the provider machine learning model is used to transform the output data sample into the corresponding output feature vector respectively.

5. The method of claim 2, wherein the method is performed by the provider, and the method further comprises: (d) providing the exchange samples to the acquirer for being applied to the machine learning;

or, the method is performed by a third party other than the provider and the acquirer, and respective feature of the provider training sample and/or the output data sample is subjected to a hash transformation, and the method further comprises: (d) providing the exchange samples to the acquirer for being applied to the machine learning;

or, the method is performed by the acquirer, and the provider training sample and/or the output data sample is encrypted, wherein the acquirer decrypts the encrypted provider training sample and/or the encrypted output data sample and performs steps (a) and (b), by calling a service provided by the third party other than the provider and the acquirer.

6. The method of claim 1, wherein in step (b), inputting each output data sample into the provider machine learning model and using an intermediate result of the provider machine learning model for the each output data sample as the output feature vector corresponding to the each output data sample.

7. The method of claim 1, wherein the provider machine learning model is based on a deep neural network algorithm, and in step (b), using node values of a middle layer and/or a output layer of the provider machine learning model for each output data sample as the output feature vector corresponding to the each output data sample.

8. The method of claim 1, wherein prior to step (a), the method further comprising: (e) acquiring the identifiers of at least one portion of the data samples from the acquirer and labels, with respect to a problem of a machine learning target, of the at least one portion of the data samples from the acquirer, and in step (a), acquiring at least one part of the data samples having the identifiers acquired in step (e) among the data samples of the provider, combining each data sample among the at least one part of the data samples with the label corresponding to the identifier of the each data sample into a provider training sample, and training the provider machine learning model according to a supervised machine learning algorithm based on a set of the provider training samples.

9. The method of claim 8, wherein the exchange samples are applied by the acquirer to the machine learning with respect to the machine learning target.

10. A computing device for data exchange between a data provider and a data acquirer with respect to machine learning, comprising a storage component having a set of computer executable instructions stored therein, and a processor, wherein, when the set of the computer executable instructions is executed by the processor, following steps are performed: a provider machine learning model obtaining step, for obtaining a provider machine learning model; an output feature vector transformation step, for transforming output data samples among data samples of the provider into corresponding output feature vectors respectively, using the provider machine learning model, wherein the output data samples are to be provided from the provider to the acquirer; and an exchange sample generation step, for combining the transformed output feature vectors with corresponding identifiers identifying the data samples into exchange samples, wherein the exchange samples are able to be applied to the machine learning by the acquirer so that the exchange samples are able to be acquired and used by the acquirer to obtain an acquirer machine learning model, or the exchange sample is able to be acquired and used by the acquirer to make a prediction using the acquirer machine learning model, wherein the exchange sample is able to be concatenated, by the acquirer, with a local data sample corresponding to the exchange sample based on the identifier of the exchange sample and the concatenated sample is used by the acquirer to obtain the acquirer machine learning model or is used by the acquirer to make a prediction using the acquirer machine learning model.

11. The computing device of claim 10, wherein the provider machine learning model obtaining step comprises: learning the provider machine learning model based on provider training samples from the provider, wherein the provider machine learning model comprises at least one of a supervised machine learning model, an unsupervised machine learning model and a semi-supervised machine learning model.

12. The computing device of claim 11, wherein the output data samples contain the provider training samples, and in the output feature vector transformation step, for the provider training samples, the provider machine learning model which is being learned is used to transform the provider training sample into the corresponding output feature vector respectively.

13. The computing device of claim 11, wherein in the output feature vector transformation step, for the output data sample that is not the provider training sample, after the learning process of the provider machine learning model is completed, the provider machine learning model is used to transform the output data sample into the corresponding output feature vector respectively.

14. The computing device of claim 10, wherein in the output feature vector transformation step, inputting each output data sample into the provider machine learning model and using an intermediate result of the provider machine learning model for the each output data sample as the output feature vector corresponding to the each output data sample.

15. The computing device of claim 11, wherein a machine learning algorithm used to obtain the provider machine learning model in the provider machine learning model obtaining step is the same as the machine learning algorithm used by the acquirer to obtain the acquirer machine learning model.

16. The computing device of claim 10, wherein when the set of the computer executable instructions is executed by the processor, a following step is further performed prior to the provider machine learning model obtaining step: an acquisition step, for acquiring the identifiers of at least one portion of the data samples from the acquirer and labels, with respect to a problem of a machine learning target, of the at least one portion of the data samples from the acquirer, and in the provider machine learning model obtaining step, acquiring at least one part of the data samples having the identifiers acquired in the acquisition step among the data samples of the provider, combining each data sample among the at least one part of the data samples with the label corresponding to the identifier of the each data sample into a provider training sample, and training the provider machine learning model according to a supervised machine learning algorithm based on a set of the provider training samples.

17. The computing device of claim 16, wherein the acquisition step further comprises acquiring a label generation time corresponding to the label, and in the provider machine learning model obtaining step, acquiring at least one part of the data samples, which have the identifiers acquired in the acquisition step and whose generation time is earlier than corresponding label generation time, among the data samples of the provider, and combining each data sample among the at least one part of the data samples with the label corresponding to the identifier of the each data sample into the provider training sample.

18. The computing device of claim 10, wherein in the exchange sample generation step, combining the transformed output feature vector, the corresponding identifier, and a corresponding output data sample generation time into the exchange sample.

19. A non-transitory computer-readable storage medium storing instructions that when executed by a processor causes the processor to perform a method for data exchange between a data provider and a data acquirer with respect to machine learning, the method comprising operations of:

obtaining a provider machine learning model;

transforming output data samples among data samples of the provider into corresponding output feature vectors respectively, using the provider machine learning model, wherein the output data samples are to be provided from the provider to the acquirer; and combining the transformed output feature vectors with corresponding identifiers identifying the data samples into exchange samples, wherein the exchange samples are able to be applied to the machine learning by the acquirer so that the exchange samples are able to be acquired and used by the acquirer to obtain an acquirer machine learning model, or the exchange sample is able to be acquired and used by the acquirer to make a prediction using the acquirer machine learning model, wherein the exchange sample is able to be concatenated, by the acquirer, with a local data sample corresponding to the exchange sample based on the identifier of the exchange sample and the concatenated sample is used by the acquirer to obtain the acquirer machine learning model or is used by the acquirer to make a prediction using the acquirer machine learning model.

* * * * *